(12) United States Patent
Wang et al.

(10) Patent No.: US 9,317,707 B2
(45) Date of Patent: Apr. 19, 2016

(54) METHOD AND SYSTEM FOR PROTECTING A DRIVER

(71) Applicant: TENCENT TECHNOLOGY (SHENZHEN) COMPANY LIMITED, Shenzhen (CN)

(72) Inventors: Yu Wang, Shenzhen (CN); Wu Haitao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 37 days.

(21) Appl. No.: 14/156,540

(22) Filed: Jan. 16, 2014

(65) Prior Publication Data

US 2014/0129846 A1    May 8, 2014

Related U.S. Application Data

(63) Continuation of application No. PCT/CN2012/078041, filed on Jul. 2, 2012.

(30) Foreign Application Priority Data

Jul. 28, 2011    (CN) .......................... 2011 1 0213910

(51) Int. Cl.
*G06F 21/00*    (2013.01)
*G06F 21/62*    (2013.01)
(Continued)

(52) U.S. Cl.
CPC ............ *G06F 21/6209* (2013.01); *G06F 21/51* (2013.01); *G06F 21/54* (2013.01);
(Continued)

(58) Field of Classification Search
CPC ......... H04L 63/04; H04L 63/12; H04L 63/16; G06F 21/05; G06F 21/06; G06F 21/07; G06F 2003/0697; G06F 13/10; G06F 17/30141; G06F 3/06

USPC .......... 719/321–327; 713/164–194; 710/1–7, 710/20–21, 29–51; 726/26–30
See application file for complete search history.

(56) References Cited

U.S. PATENT DOCUMENTS

| 7,024,593 B1 * | 4/2006 | Budd et al. ...................... 714/48 |
| 7,577,985 B1 | 8/2009 | Urosu |

(Continued)

FOREIGN PATENT DOCUMENTS

| CN | 1591329 A | 3/2005 |
| CN | 1900940 A | 1/2007 |

(Continued)

OTHER PUBLICATIONS

International Search Report for PCT/CN2012/078041 dated Oct. 18, 2012.

(Continued)

*Primary Examiner* — Madhuri Herzog
(74) *Attorney, Agent, or Firm* — Marshall Gerstein & Borun LLP

(57) ABSTRACT

Various examples of the present disclosure provide a method and a system for protecting a driver. The method includes encrypting a program file, and sending an Input/Output Request Package (IRP) and the encrypted program file; receiving the IRP and the encrypted program file, decrypting the encrypted program file, verifying the decrypted program file; and, if verification is passed, returning a handle, otherwise, not returning the handle. In the examples of the present disclosure, the program file of the application layer is encrypted, and the encrypted program file is sent when the IRP is sent; the driver layer decrypts and verifies the encrypted program file, and returns the handle to the application layer when the verification is passed, so that the application layer can access the driver layer through the handle; if the verification is not passed, the driver layer rejects the access of the application layer. Therefore, a legitimate application layer can communicate with the driver layer, a suspicious program is prevented from accessing the driver layer, and the security of the driver layer is improved.

14 Claims, 4 Drawing Sheets

(51) Int. Cl.
  *G06F 21/70* (2013.01)
  *H04L 29/06* (2006.01)
  *G06F 21/51* (2013.01)
  *G06F 21/54* (2013.01)
  *G06F 3/06* (2006.01)
(52) U.S. Cl.
  CPC ............... *G06F 21/70* (2013.01); *H04L 63/12* (2013.01); *H04L 63/126* (2013.01); *G06F 3/062* (2013.01); *G06F 3/0653* (2013.01)

(56) References Cited

U.S. PATENT DOCUMENTS

| | | | |
|---|---|---|---|
| 2003/0177435 A1* | 9/2003 | Budd et al. | 714/776 |
| 2006/0069692 A1 | 3/2006 | Pernia | |
| 2006/0253859 A1* | 11/2006 | Dai | G06F 9/545 719/321 |
| 2006/0265757 A1* | 11/2006 | Endoh | H04M 1/72522 726/26 |
| 2008/0209563 A1 | 8/2008 | Rogers et al. | |
| 2011/0047305 A1* | 2/2011 | Kim | G06F 21/82 710/63 |

FOREIGN PATENT DOCUMENTS

| | | |
|---|---|---|
| CN | 101008974 A | 8/2007 |
| CN | 101447007 A | 6/2009 |

OTHER PUBLICATIONS

International Preliminary Report on Patentability from PCT/CN2012/078041 dated Jan. 28, 2014.

Office action from Chinese Application No. 201110213910.4 dated Jun. 19, 2013.

* cited by examiner

METHOD AND SYSTEM FOR PROTECTING A DRIVER

CROSS-REFERENCE TO RELATED APPLICATIONS

This application is a continuation of International Application No. PCT/CN2012/078041, filed on Jul. 2, 2012. This application claims the benefit and priority of Chinese Patent Application No. 201110213910.4, filed on Jul. 28, 2011. The entire disclosures of each of the above applications are incorporated herein by reference.

FIELD OF THE INVENTION

The present invention relates to a driver protecting field, and more particularly, to a method and a system for protecting a driver.

BACKGROUND OF THE INVENTION

An Input/Output (I/O) Request Package (IRP) is a kind of data structure in the Windows kernel, and is associated with I/O. When an application at an upper layer communicates with a low-level driver layer, the application sends an I/O request. The operating system convers the I/O request into corresponding IRP data. The IRP data with different types are transmitted to different dispatch functions based on the type of the IPR data.

The IRP has two basic attributes. One is a major function (MajorFunction), which is configured to record a major type of the IRP, and associate the major function of the IRP with a dispatch function. The other is a minor function (MinorFunction), which is configured to record a subtype of the IRP. The operating system dispatches the IRPs to different dispatch functions according to the MajorFunction. In the dispatch function, it may continue to determine which MinorFunction the IRP belongs to. Functions related to the file I/O, such as a function of creating a file kernel object (CreateFile), a function of reading a file (ReadFile), and a function of writing a file (WriteFile), etc., can create IRPs with corresponding types, such as an IPR with a creating type (IRP_MJ_CREATE), an IPR with a reading type (IRP_MJ_READ), and an IPR with a writing type (IRP_MJ_WRITE), etc. These IRPs are transmitted to the dispatch functions at the driver layer. In this case, the CreateFile function is configured to create or open an object, and return a handle that may be used to access the object; the ReadFile function is configured to read out data to a file from a position where a file pointer points to, and supports both synchronization and asynchronization; the WriteFile function is configured to write data to a file.

In the operating system, if an application wants to open the driver layer, the IRP_MJ_CREATE may be sent to the driver layer firstly, and the driver layer may return a handle after a dispatch function performs appropriate processing. In this case, the handle is an integer value, and is used to identify different objects of the application in the application layer, and to identify different instants in similar objects of the application, such as a window, a button, an icon, a scroll bar, an output device, a control, or a file, and so forth. The application layer can access the corresponding driver layer through the handle.

However, if a third-party application views the handle through a tool, and open the driver layer through the handle, the third-party application can send to the driver layer an I/O control function (IOCTL) which manages I/O channels in the device driver layer, so as to directly control the driver layer. If the third-party application is a malicious software, a computer of a user can be vandalized by the third-party application.

SUMMARY OF THE INVENTION

Various examples of the present disclosure provide a method for protecting a driver, including:
  encrypting a program file;
  sending an Input/Output Request Package (IRP) and the encrypted program file;
  receiving the IRP and the encrypted program file,
  decrypting the encrypted program file, and verifying the decrypted program file; and,
  if verification is passed, returning a handle, otherwise, not returning the handle.

Various examples of the present disclosure provide a system for protecting a driver, including an application layer module and a driver layer module, wherein
  the application layer module includes:
  an encryption sub-module, to encrypt a program file; and,
  a first communication sub-module, to send an Input/Output Request Package (IRP) and the encrypted program file to a second communication sub-module of the driver layer module;
  the driver layer module includes:
  the second communication sub-module, to receive the IRP and the encrypted program file; and,
  a decryption and verification sub-module, to decrypt the encrypted program file, and verify the decrypted program file;
  wherein the second communication sub-module is further to return a handle to the first communication sub-module if verification is passed, otherwise, not return the handle to the first communication sub-module.

In the above-mentioned method and system for protecting the driver, the program file of the application layer is encrypted, and the encrypted program file is sent when the IRP is sent; the driver layer decrypts and verifies the encrypted program file, and returns the handle to the application layer when the verification is passed, so that the application layer can access the driver layer through the handle; if the verification is not passed, the driver layer rejects the access of the application layer. Therefore, a legitimate application layer can communicate with the driver layer, a suspicious program is prevented from accessing the driver layer, and the security of the driver layer is improved.

DETAILED DESCRIPTION OF THE INVENTION

Hereinafter, the present disclosure will be described in further detail with reference to the accompanying drawings and examples.

Figure 1:
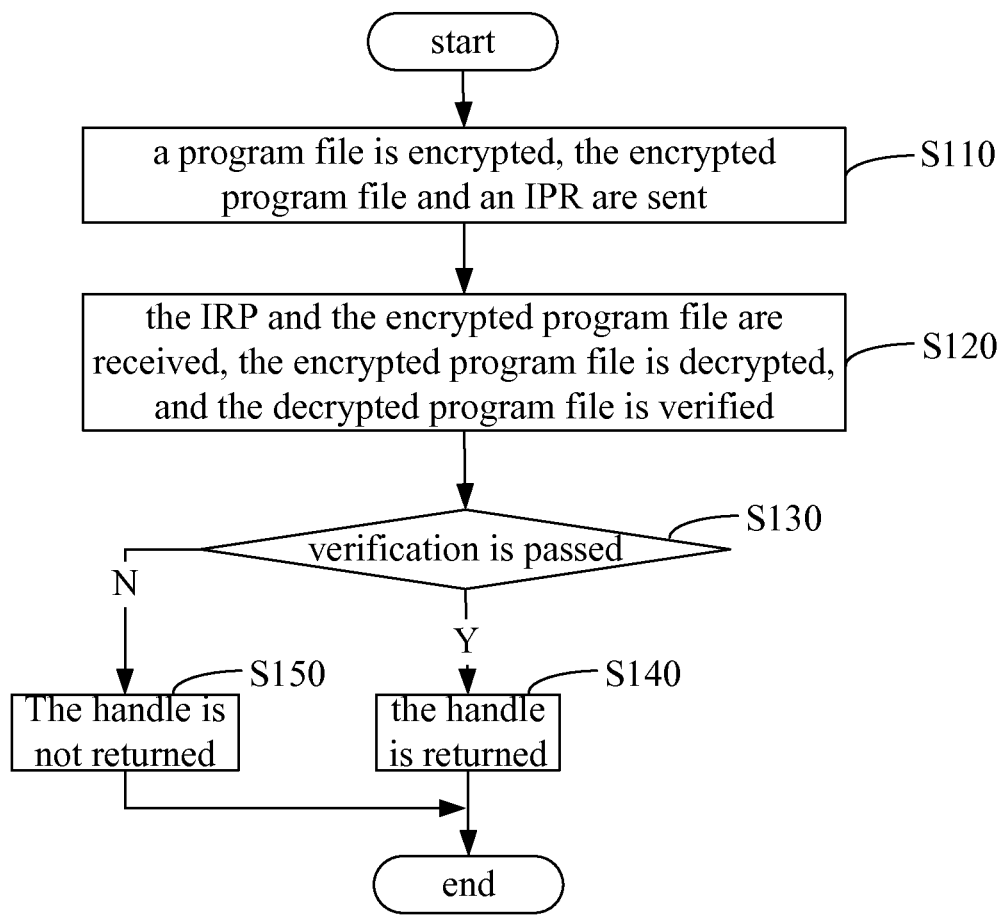
FIG. 1 is a flowchart illustrating a method for protecting a driver in accordance with an example of the present disclosure.

As shown in FIG. 1, in an exemplary example, a method for protecting a driver may include processes as follows.

In block S110, a program file is encrypted, the encrypted program file and an IPR are sent.

In this case, asymmetric encryption is performed to the program file of the application layer, which means that the asymmetric encryption is performed to an application file. In the example, the asymmetric encryption may be the RSA algorithm. In this case, the asymmetric encryption means that encryption and decryption do not use a same key. Usually, there are two keys, which are respectively referred to as a "public key" and a "private key". An encrypted file cannot be open unless these two keys are used in pairs. The "public key" can be published to the public, on the contrary, the "private key" could not be published to the public, but is known by a unique holder. The RSA public key encryption algorithm, which is an asymmetric encryption algorithm, is developed by Ron Rivest, Adi Shamirh and LenAdleman in 1977. The RSA algorithm is applied to data encryption, and can also be applied to a digital signature algorithm. The RSA algorithm is easy to understand and operate, and is used widely. The RSA algorithm has a high encryption security, and is difficult to be cracked.

The application layer may send an I/O request when the application layer accesses the driver layer. The I/O request may be converted into the IRP, and the encrypted program file is send at the same time, so that the driver layer may verify an identity of the application layer.

In an example, the operation of sending the IRP and the encrypted program file may include sending the IRP through a process, wherein there is a corresponding relationship between an identifier (PID) of the process and a path of the encrypted file.

In another example, the operation of sending the IRP and the encrypted application file may include sending the IRP through a process, wherein the path of the encrypted file is stored in a process structure body (EPROCESS) of the process.

The application layer may send an access request through the I/O-related function CreateFile. The corresponding IRP, i.e., the IRP_MJ_CREATE, may be created. The IRP_MJ_CREATE may be dispatched to a dispatch function in the driver layer.

In block S120, the IRP and the encrypted program file are received, the encrypted program file is decrypted, and the decrypted program file is verified.

In an example, when the IRP is sent through the process in block S110, and there is the corresponding relationship between the PID of the process and the path of the encrypted program file, accordingly, the operation of receiving the IRP and the encrypted program file in block S120 may include receiving the IRP through the process, obtaining the path of the encrypted program file according to the PID of the process, and obtaining the encrypted program file according to the path of the encrypted program file.

In another example, when the IRP is sent through the process in block S110, and the path of the encrypted program file is stored in the EPROCESS of the process, accordingly, the operation of receiving the IRP and the encrypted program file in block S120 may include receiving the IRP through the process, analyzing the EPROCESS of the process to obtain the path of the encrypted program file, and obtaining the encrypted program file according to the path of the encrypted program file.

After receiving the IRP and the encrypted program file of the application layer, the driver layer may decrypt the encrypted program file of the application layer. In this case, the encrypted program file may be decrypted using the RSA algorithm. The decrypted program file is verified. If the verification is passed, a handle of the driver layer is returned to the application layer, so that the application layer may access the driver layer according to the handle. If the verification is not passed, the driver layer may reject the access of the application layer.

In block S130, it is determined whether the verification is passed, and an operation in block S140 is performed when the verification is passed, otherwise, an operation in block S150 is performed.

In block S140, the handle is returned. The handle of the driver layer is returned.

In block S150, the handle is not returned.

Figure 2:
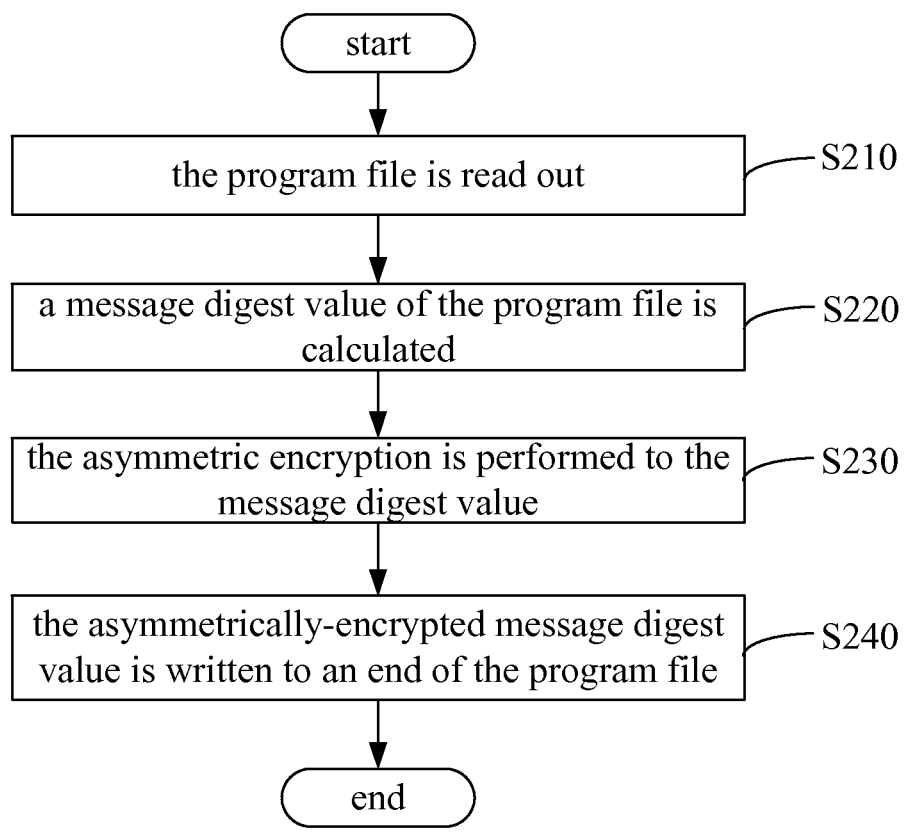
FIG. 2 is a flowchart illustrating a process for encrypting a program file in accordance with an example of the present disclosure.

In an exemplary example, as shown in FIG. 2, the process for encrypting the program file may include operations as follows.

In block S210, the program file is read out.

In this case, the program file of the application layer is read out firstly. When the program file has a Portable Execute (PE) format, contents except a DOS header, a PE header, and a section table of the PE file are read out.

In block S220, a message digest value of the program file is calculated.

In this case, if the format of the program file is the PE format, the message digest value of the obtained contents except the DOS header, the PE header, and the section table of the PE file is calculated. Usually, the message digest value may be a MD5 value.

In block S230, the asymmetric encryption is performed to the message digest value.

In this case, the asymmetric encryption is performed to the calculated message digest value, for example, the encryption is performed using the RSA algorithm.

In block S240, the asymmetrically-encrypted message digest value is written to an end of the program file.

In this case, the encrypted message digest value is written to the end of the program file of the application layer, so that the encrypted message digest value may be sent together with the program file of the application layer.

Figure 3:
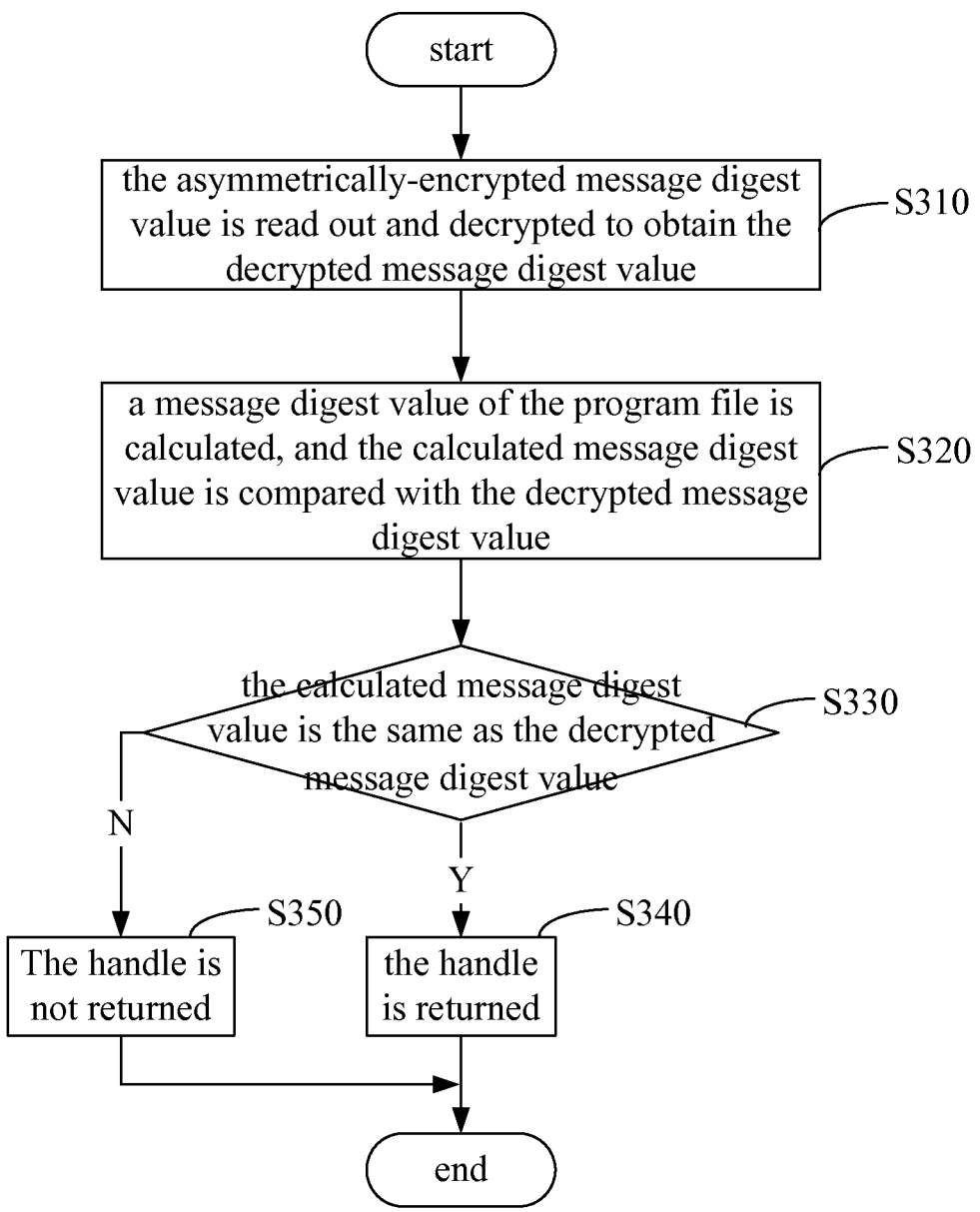
FIG. 3 is a flowchart illustrating a process for decrypting and verifying an encrypted program file in accordance with an example of the present disclosure.

In an exemplary example, as shown in FIG. 3, the process of decrypting the encrypted program file, verifying the decrypted program file, returning the handle if the verification is passed, otherwise, terminating the process may include operations as follows.

In block S310, the asymmetrically-encrypted message digest value is read out and decrypted to obtain the decrypted message digest value.

In this case, the program file of the application layer is obtained, and the end of the program file is read out to obtain the asymmetrically-encrypted message digest value. The asymmetrically-encrypted message digest value is decrypted using the RSA algorithm to obtain the decrypted message digest value.

In block S320, a message digest value of the program file is calculated, and the calculated message digest value is compared with the decrypted message digest value.

In this case, the driver layer may calculate the message digest value of the program file of the application layer. If the program file is a PE file, wherein the PE file may include a DOS header, a PE file flag, an image file, and an optional image header, the PE file flag may be the PE header, the image file may be basic information of the PE file, and the optional image header may be the section table, the message digest value of the contents except the DOS header, the PE header and the section table of the PE file is calculated. The calculated message digest value is compared with the decrypted message digest value. If the calculated message digest value is the same as the decrypted message digest value, the handle of the driver layer is returned to the application layer, so that the application layer may access the driver layer through the handle. If the calculated message digest value is different from the decrypted message digest value, the driver layer may reject the access of the application layer.

In block S330, it is determined whether the calculated message digest value is the same as the decrypted message digest value. If the calculated message digest value is the same as the decrypted message digest value, an operation in block S340 is performed, otherwise, an operation in block S350 is performed.

In block S340, the handle is returned.

In block S350, the handle is not returned.

Figure 4:
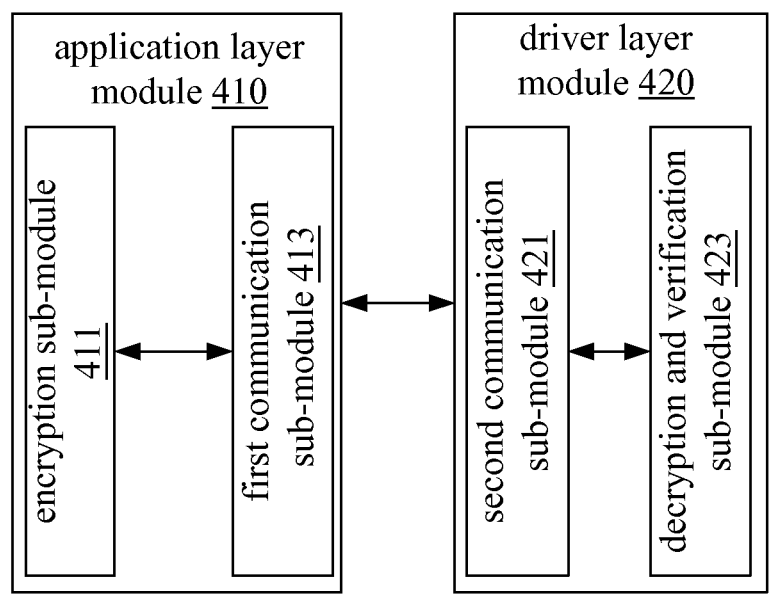
FIG. 4 is a schematic diagram illustrating an internal structure of a system for protecting a driver in accordance with an example of the present disclosure.

As shown in FIG. 4, an exemplary example of the present disclosure provides a system for protecting a driver, including an application layer module 410 and a driver layer module 420.

In the example, the application layer module 410 may be an application. The application layer module 410 may include an encryption sub-module 411 and a first communication sub-module 413, wherein the encryption sub-module 411 and the first communication sub-module 413 are connected with each other. The encryption sub-module 411 may be configured to encrypt a program file. The first communication sub-module 413 may be configured to send an IRP and the encrypted program file to the driver layer module 420.

The encryption sub-module 411 may be configured to perform asymmetric encryption to the program file of the application layer. In the example, the asymmetric encryption may be performed using the RSA algorism.

When the application layer module 410 accesses the driver layer module 420, the application layer module 410 may send an I/O request through the first communication sub-module 413. The I/O request is converted into the IRP, at the same time, the first communication sub-module 413 may send the encrypted program file, so that the driver layer module 420 may verify an identity of the application layer module 410.

In an example, the application layer module 410 may send an access request through an I/O-related function CreateFile. The corresponding IRP with a creating type (IRP_MJ_CREATE) may be created. The IRP_MJ_CREATE may be dispatched to a dispatch function in the driver layer module 420.

In an example of the present disclosure, the driver layer module 420 may be a driver program. The driver layer module 420 may include a second communication sub-module 421 and a decryption and verification sub-module 423, wherein the second communication sub-module 421 and the decryption and verification sub-module 423 are connected with each other.

The second communication sub-module 421 may be configured to receive the IRP and the encrypted program file.

In an example, the first communication sub-module 413 is configured to send the IRP through a process, wherein there is a corresponding relationship between a PID of the process and a path of the encrypted program file. Accordingly, the second communication sub-module 421 may be configured to receive the IRP through the process, obtain the path of the encrypted program file according to the PID of the process, and obtain the encrypted program file according to the path of the encrypted program file.

In another example, the first communication sub-module 413 may be configured to send the IRP through the process, wherein the path of the encrypted program file is stored in the EPROCESS of the process. Accordingly, the second communication sub-module 421 may be configured to receive the IRP through the process, analyze the EPROCESS of the process to obtain the path of the encrypted program file, and obtain the encrypted program file according to the path of the encrypted program file.

The decryption and verification sub-module 423 may be configured to decrypt the encrypted program file, and verify the decrypted program file. When the verification is passed, the second communication sub-module 421 may return a handle of the driver layer to the first communication sub-module 413 of the application layer module 410. When the verification is not passed, the second communication sub-module 421 does not return the handle to the first communication sub-module 413.

The second communication sub-module 421 of the driver layer module 420 may send, after receiving the IRP and the encrypted program file of the application layer, the IRP and the encrypted program file to the decryption and verification sub-module 423. The decryption and verification sub-module 423 may decrypt the encrypted program file, for example, the decryption and verification sub-module 423 may decrypt the encrypted program file using the RSA algorithm. Then, the decryption and verification sub-module 423 may verify the decrypted program file of the application layer. If the verification is passed, the handle is returned to the application layer module 410, so that the application layer module 410 may access the driver layer module 420 according to the handle; if the verification is not passed, the driver layer module 420 may reject the access of the application layer module 410.

In an example, the encryption sub-module 411 may be further configured to read out the program file, calculate a message digest value of the program file, perform the asymmetric encryption to the message digest value, and write the asymmetrically-encrypted message digest value into the end of the program file.

In this case, the encryption sub-module 411 may read out the program file of the application layer firstly. The program file of the application layer may be a PE file, which includes a DOS header, a PE file flag, an image file, and an optional image header. Herein, the PE file flag is the PE header, the image file is basic information of the PE file, and the optional image header is the section table. The encryption sub-module 411 may read out contents other than the DOS header, the PE header, and the section table of the PE file, calculate the message digest value of the contents other than the DOS header, the PE header, and the section table of the PE file, perform the asymmetric encryption to the calculated message digest value, and write the asymmetrically-encrypted message digest value into the end of the program file. In this case, the RSA algorithm may be employed to perform the asymmetric encryption.

In an example of the present disclosure, the decryption and verification sub-module 423 may be configured to read out the asymmetrically-encrypted message digest value, decrypt the asymmetrically-encrypted message digest value to obtain the decrypted message digest value, calculate a message digest value of the program file, and compare the calculated message digest value with the decrypted message digest value. When the calculated message digest value is the same as the decrypted message digest value, the second communication sub-module 421 of the driver layer module 420 may return the handle to the first communication sub-module 413 of the application layer module 410. When the calculated message digest value is different from the decrypted message digest value, the second communication sub-module 421 of the driver layer module 420 does not return the handle to the first communication sub-module 413 of the application layer module 410.

The decryption and verification sub-module 423 may be configured to obtain the program file of the application layer, read the end of the program file to obtain the asymmetrically-encrypted message digest value, and decrypt, using the RSA algorithm, the asymmetrically-encrypted message digest value to obtain the decrypted message digest value. The decryption and verification sub-module 423 may be configured to calculate the message digest value of the program file of the application layer. In this case, if the program file has a PE format, the message digest value of the contents other than the DOS header, the PE header, and the section table of the PE file is calculated. The decryption and verification sub-module 423 may compare the calculated message digest value with the decrypted message digest value. If the calculated message digest value is the same as the decrypted message digest value, the handle is returned to the first communication sub-module 413 of the application layer module 410 through the second communication sub-module 421, so that the application layer module 410 may access the driver layer module 420 according to the handle. If the calculated message digest value is different from the decrypted message digest value, the driver layer module 420 may reject the access of the application layer module 410.

The decryption and verification sub-module 423 may be further configured to decrypt, in the IRP with the creating type (IRP_MJ_CREATE), the encrypted program file and verify the decrypted program file. When the verification is passed, the application layer module 410 may access the driver layer module 420 through the handle; create, through an I/O-related function such as the function of reading a file (ReadFile) and the function of writing a file (WriteFile), corresponding IRPs such as an IRP with a reading type (IRP_MJ_READ) and an IRP with a writing type (IRP_MJ_WRITE); and dispatch the IRP_MJ_READ and the IRP_MJ_WRITE to a dispatch function of the driver layer module 420 to read and write the driver layer.

In the above-mentioned method and system for protecting the driver, the program file of the application layer is encrypted, and the encrypted program file is sent when the IRP is sent; the driver layer decrypts and verifies the encrypted program file, and returns the handle to the application layer when the verification is passed, so that the application layer can access the driver layer through the handle; if the verification is not passed, the driver layer rejects the access of the application layer. Therefore, a legitimate application layer can communicate with the driver layer, a suspicious program is prevented from accessing the driver layer, and the security of the driver layer is improved.

In addition, a message digest value of the program file is calculated. A message digest value calculated by the application layer is compared with a message digest value calculated by the driver layer, so that it is convenient to perform the verification. Further, the RSA algorithm is used to perform the asymmetric encryption or decryption, so that a high security is achieved.

What has been described and illustrated herein is an example of the present disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

The invention claimed is:

1. A method for protecting a driver on a computer, the method comprising:
   receiving an Input/Output Request Package (IRP) and an encrypted program file from an application, wherein the encrypted program file is contained in the IRP, wherein the IRP defines how the application accesses the driver, and wherein the encrypted program file is to identify the application;
   decrypting the encrypted program file; verifying the decrypted program file; and,
   if verification is passed, returning a handle to the application, or otherwise, not returning the handle to the application.

2. The method of claim 1, wherein
prior to receiving the IRP and the encrypted program file, the method further comprises: the application
sending the IRP and the encrypted program file, which comprises:
sending the IRP through a process,
wherein there is a corresponding relationship between an identifier (PID) of the process and a path of the encrypted program file; and
receiving the IRP and the encrypted program file comprises:
receiving the IRP through the process;
obtaining the path of the encrypted program file according to the PID of the process; and,
obtaining the encrypted program file according to the path of the encrypted program file.

3. The method of claim 1, wherein
prior to receiving the IRP and the encrypted program file, the method further comprises: the application sending the IRP and the encrypted program file, which comprises:
sending the IRP through a process,
wherein a path of the encrypted program file is stored in a process structure body (EPROCESS) of the process; and
receiving the IRP and the encrypted program file comprises:
receiving the IRP through the process;
analyzing the EPROCESS of the process to obtain the path of the encrypted program file; and,
obtaining the encrypted program file according to the path of the encrypted program file.

4. The method of claim 1, wherein prior to receiving the IRP and the encrypted program file, the method further comprises encrypting a program file, which comprises:
   reading out the program file;
   calculating a first message digest value of the program file;
   performing asymmetric encryption to the first message digest value; and,
   writing the asymmetrically-encrypted first message digest value into an end of the program file.

5. The method of claim 4, wherein decrypting the encrypted program file, verifying the decrypted program file, if the verification is passed, returning the handle to the application, otherwise, not returning the handle to the application comprises:
   reading out the asymmetrically-encrypted first message digest value;
   decrypting the asymmetrically-encrypted first message digest value to obtain the first message digest value;
   calculating a second message digest value of the program file;
   comparing the second message digest value with the first message digest value; and, if the second message digest value is the same as the first message digest value, returning the handle to the application, otherwise, not returning the handle to the application.

6. The method of claim 5, wherein the asymmetric encryption or decryption is performed using a RSA algorism.

7. The method of claim 1, wherein a type of the IRP is a creating type, and
decrypting the encrypted program file and verifying the decrypted program file comprises:
decrypting, in the IRP with the creating type, the encrypted program file and verifying the decrypted program file.

8. A system for protecting a driver, comprising:
a processor, and
a non-transitory storage medium on which is to store machine readable instructions that when executed by the processor cause the processor to:
receive an Input/Output Request Package (IRP) and an encrypted program file from an application, wherein the encrypted program file is contained in the IRP package, the IRP defines a method of the application accessing the driver, and the encrypted program file is to identify the application;
decrypt the encrypted program file, and verify the decrypted program file; and
return a handle to the application
if verification is passed, or otherwise, not return the handle to the application.

9. The system of claim 8, wherein
the machine readable instructions when executed by the processor cause the processor to:
prior to receiving the IRP and the encrypted program file from the application, send the IRP through a process; wherein there is a corresponding relationship between an identifier (PID) of the process and a path of the encrypted program file; and
receive the IRP through the process, obtain the path of the encrypted program file according to the PID of the process, and obtain the encrypted program file according to the path of the encrypted program file.

10. The system of claim 8, wherein the machine readable instructions when executed by the processor cause the processor to:
prior to receiving the IRP and the encrypted program file, send the IRP through a process; wherein a path of the encrypted program file is stored in a process structure body (EPROCESS) of the process; and
receive the IRP through the process, analyze the EPROCESS of the process to obtain the path of the encrypted program file, and obtain the encrypted program file according to the path of the encrypted program file.

11. The system of claim 8, wherein the machine readable instructions when executed by the processor cause the processor to: read out a program file, calculate a first message digest value of the program file, perform asymmetric encryption to the first message digest value, and write the asymmetrically-encrypted first message digest value into an end of the program file.

12. The system of claim 11, wherein the machine readable instructions when executed by the processor cause the processor to:
read out the asymmetrically-encrypted first message digest value;
decrypt the asymmetrically-encrypted first message digest value to obtain the first message digest value;
calculate a second message digest value of the program file; and
compare the second message digest value with the first message digest value;
return the handle to the application if the second message digest value is the same as the first message digest value, otherwise, not return the handle to the application.

13. The system of claim 12, wherein the machine readable instructions when executed by the processor cause the processor to:
perform the asymmetric encryption or decryption using a RSA algorism.

14. The system of claim 12, wherein a type of the IRP is a creating type, the machine readable instructions when executed by the processor cause the processor to
decrypt, in the IRP with the creating type, the encrypted program file and verify the decrypted program file.

* * * * *